J. W. LATSHAW.
APPARATUS FOR FINISHING PIPES.
APPLICATION FILED APR. 25, 1916.
1,192,536.
Patented July 25, 1916.
3 SHEETS—SHEET 3.
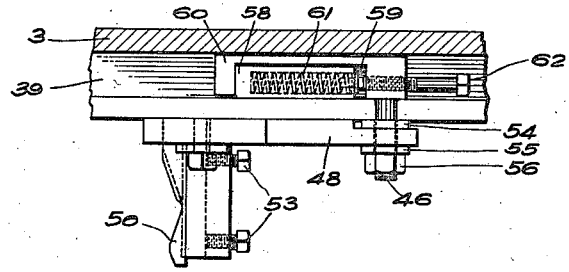
FIG. 6
FIG. 7
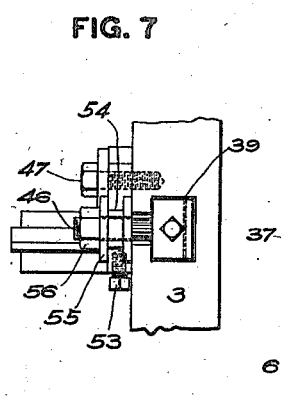
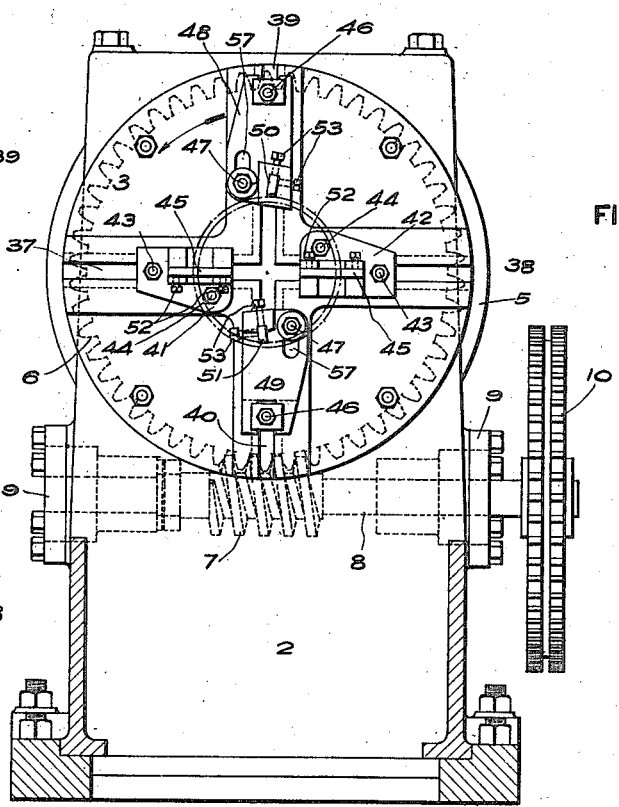
FIG. 5
FIG. 10
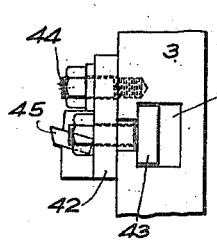
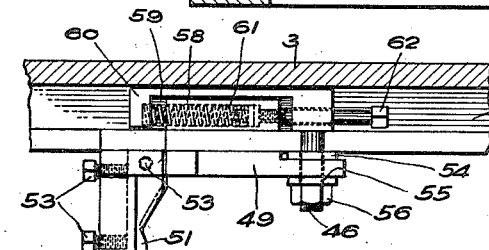
FIG. 8
FIG. 9
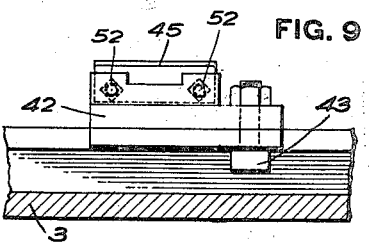
WITNESSES
Chas Losterman
R Shettle
INVENTOR
J. W. Latshaw
by C. C. Linthicum
his Attorney

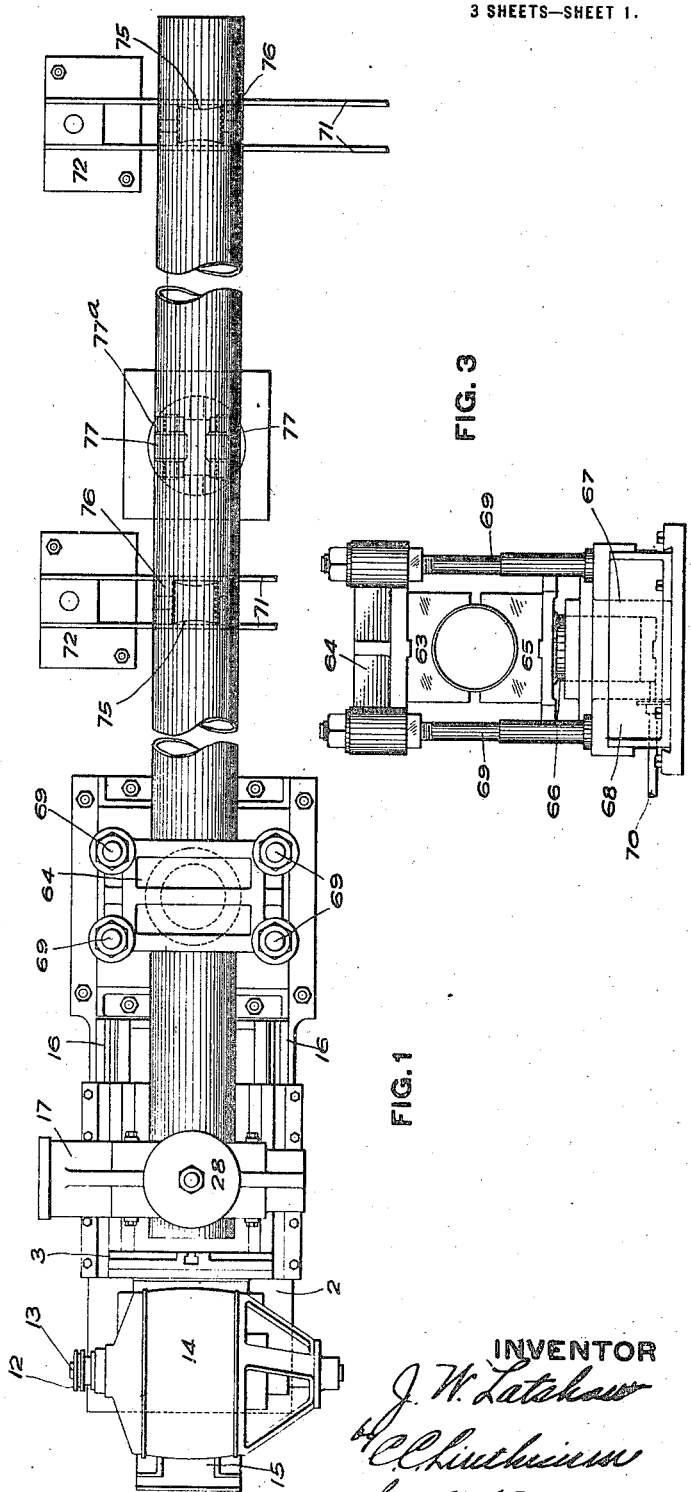

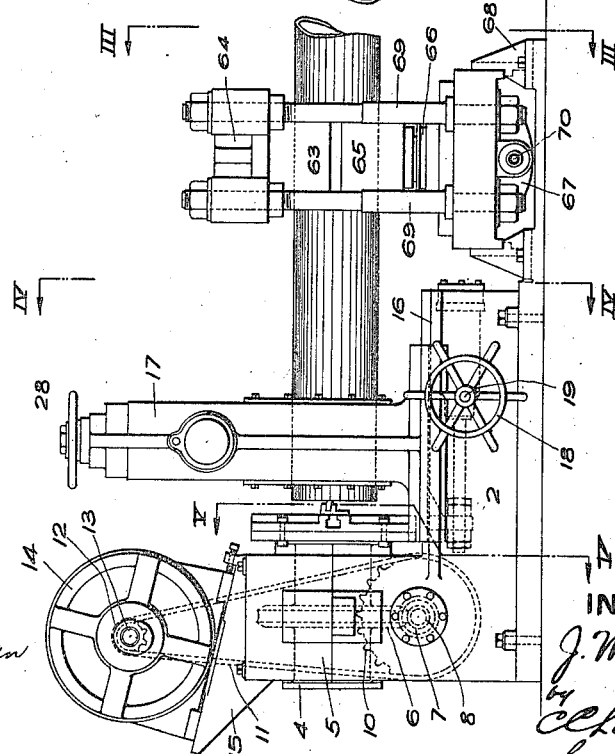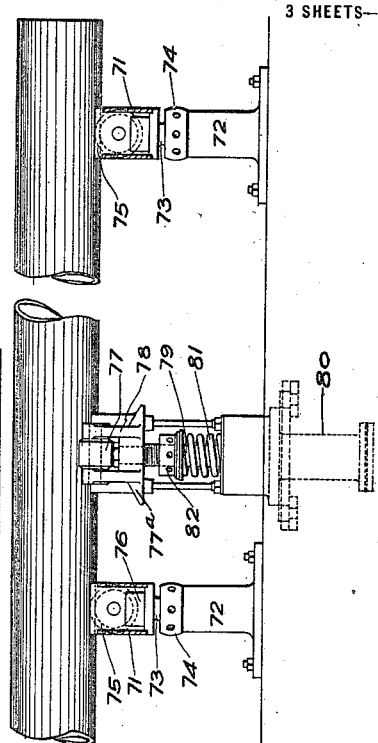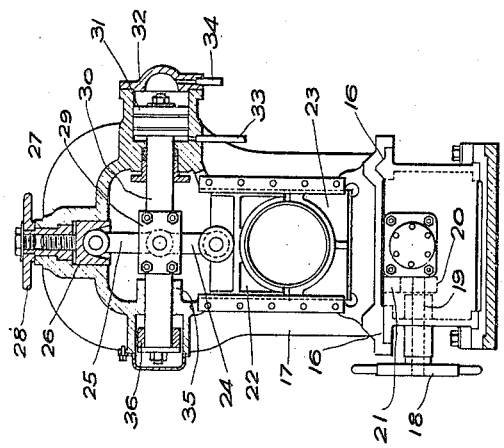

UNITED STATES PATENT OFFICE.

JOSEPH W. LATSHAW, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

APPARATUS FOR FINISHING PIPES.

1,192,536.   Specification of Letters Patent.   Patented July 25, 1916.

Application filed April 25, 1916. Serial No. 93,521.

*To all whom it may concern:*

Be it known that I, JOSEPH W. LATSHAW, a citizen of the United States, and resident of Pittsburgh, in the county of Allegheny and State of Pennsylvania, have invented certain new and useful Improvements in Apparatus for Finishing Pipes, of which the following is a specification.

My invention relates to apparatus for use in finishing the ends of welded pipes and tubes preparatory to cutting the thread on the ends thereof, and while not restricted to such use, more particularly relates to apparatus for use in rounding the ends of the larger sizes of pipes to make them more truly cylindrical and in facing and chamfering the rounded pipe ends preparatory to cutting the threads thereon.

In manufacturing welded pipes and tubes, particularly the larger sizes or those made by the lapweld process, the opposite ends of the pipes vary slightly in diameter and the ends of such pipes and tubes are found to be flattened at the weld and generally to be somewhat distorted and not truly cylindrical. As a result, the pipes when threaded are generally found to have black threads on the ends thereof; *i. e.*, threads having flat apices, due to irregularities in the surfaces and in the diameters at the opposite ends of the pipes and tubes.

One object of my invention is to provide pipe finishing apparatus having novel means whereby the ends of wrought metal pipes and tubes are faced and chamfered preparatory to cutting the threads thereon, and whereby the ends of the pipes and tubes are made more uniform in diameter or size and more truly cylindrical prior to the facing and chamfering operations and later threading operations.

Another object of this invention is to provide pipe finishing apparatus having novel means whereby the ends of the pipes or tubes are rounded and thereby made more truly cylindrical and the rounded pipe ends are faced and chamfered in preparation for the later threading operations to thereby finish the pipe ends with a more uniform bevel and provide more perfect threads.

A further object of the invention is to provide improved means whereby the pipes and tubes are handled in finishing the ends thereof for the subsequent threading operations.

A still further object of my invention is the provision of the novel constructions, combinations and arrangements of parts shown in the drawings, set forth in the appended claims, and fully described hereinafter.

Referring now to the drawings forming part of this specification, Figure 1 is a plan showing one embodiment of pipe finishing apparatus as constructed and arranged in accordance with my invention. Fig. 2 is a longitudinal side elevation of the apparatus shown in Fig. 1. Fig. 3 is a sectional end elevation of the pipe rounding mechanism forming part of the apparatus shown in Figs. 1 and 2, the section being taken on the line III—III of Fig. 2. Fig. 4 is an end elevation, partly in section, showing the adjustable pipe clamping mechanism on the facing and chamfering machine forming part of my improved apparatus, the section being taken on the line IV—IV of Fig. 2. Fig. 5 is a sectional end elevation on a larger scale showing the front of the rotary head or face-plate of the facing and chamfering machine, with the facing tools and floating chamfering tools mounted thereon, the section being taken on the line V—V of Fig. 2. Fig. 6 is a longitudinal section showing details in the construction of the chuck employed in securing the floating chamfering tool for chamfering or cutting the bevel in the outer edge of the pipe ends, on the face plate or head of the facing and chamfering machine. Fig. 7 is a detail end elevation of the apparatus shown in Fig. 6. Fig. 8 is a longitudinal section similar to Fig. 6, showing the chuck and floating chamfering tools for chamfering or cutting the bevel on the inner edge of the pipe ends. Fig. 9 is a sectional detail similar to Figs. 6 and 8, showing the construction and arrangement of the chucks by which the facing tools are secured to the rotary face plate of the facing and chamfering machine. Fig. 10 is a detail end elevation of the apparatus shown in Fig. 9. Figs. 11 and 12 are end elevations showing, relative to the pipe, the position of the supporting rollers used in supporting the pipe when being moved lengthwise thereon. Figs. 13 and 14 are end elevations similar to Figs. 11 and 12, showing the position of the supporting rollers relative to the pipe when the pipe is being rotated or turned angularly on the supporting rollers.

In the accompanying drawings, the numeral 2 designates a facing and chamfering machine having a face plate 3 on one end of a horizontal spindle or barrel 4 which is mounted in the bearing 5 on the frame of the machine 2, and the spindle 4 is provided with a worm wheel 6 meshing with the worm 7 on the horizontal worm shaft 8. The shaft 8 is secured in suitable bearings 9, 9, and is provided on one end with a chain driven wheel 10 connected by the driving chain 11 to the driving pinion 12 on one end of the armature shaft 13 of the driving motor 14. The motor 14 is adjustably mounted on a bracket 15 forming part of the frame of the machine 2. Adjustably secured on shears or ways 16 forming part of the frame of the machine 2, is an adjustable carriage 17 which is moved toward and away from the face plate 3 by means of the hand operated carriage adjusting wheel 18 on the shaft 19 which is operatively mounted on the frame of the machine and has a spur gear 20 thereon meshing with the rack 21 on the under side of the carriage 17.

The carriage 17 is provided with removable, relatively adjustable, gripping blocks or dies 22 and 23, the top die 22 being vertically movable as shown, and being pivotally connected by toggle links 24 and 25 to the lengthwise vertical adjusting screw 26 in the top of the carriage 17. The screw 26 extends through a threaded nut 27 which is rotatably secured on the top of the carriage 17 and the nut is provided with a hand wheel 28 for turning the nut in moving the toggle links to adjust the top die relative to the bottom die 23. The adjoining overlapping ends of the toggle links 24 and 25 are pivoted to the cross head 29 on the piston rod 30 which extends horizontally between the forming dies and the adjusting screw 26. One end of the piston rod 30 is provided with a piston 31 located in the double acting fluid pressure cylinder 32 forming part of the carriage 17.

The ends of the cylinder 32 are provided with ports connected to supply pipes 33, 34, and the pipes 33, 34, are connected to a source of fluid pressure, a valve (not shown) being connected to the pipes to control the admission and discharge of fluid pressure to the opposite sides of the piston 31. The opposite end of the piston rod extends through a bearing 35 on the carriage 17 and is provided with an elastic bumper 36, preferably formed of rubber to cushion the piston when the piston is moved to cause the vertically movable top die 22 to lift after operatively engaging with the end of a pipe between the dies.

The rotating face plate 3 on the facing and chamfering machine are provided with a series of radial slots 37, 38, and 39, 40, the slots 37, 38, being in alinement and at a right angle to the alined slots 39, 40. Removably secured within the slots 37, 38, so as to be on opposite sides of the axis of rotation of the face plate 3, are the adjustable chucks 41, 42, which are fastened in position on the face plate by means of bolts 43 and 44, and removably secured in each of the chucks 41, 42, is a facing tool 45 which is adapted to engage with and face off the end of the rounded pipes at right angles to the length of the pipes.

Removably secured in the slots 39, 40, by means of bolts 46 and 47 are chucks 48 and 49 in which the floating chamfering tools 50 and 51 are adjustably secured. As shown, the chamfering tool 50 is positioned to bevel the outer edge and the chamfering tool 51 is arranged to bevel the other or inner edge of the pipe ends. Set screws 52, 52, provide means for securing the facing tools in the tool holders of the chucks 41, 42, and set screws 53, 53, hold the chamfering tools 50, 51, in their respective chucks 48 and 49. (See Fig. 5).

The face plate 3 is arranged to rotate counter-clockwise, in the apparatus shown the pipe being held stationary while the ends of the pipes are being faced and chamfered by means of the gripping mechanism yet to be described.

The chucks for the chamfering tools are arranged to "float" on the face plate and yieldingly hold the chamfering tools in engagement with the edges of the end of the pipes, so as to take care of any irregularities in the surface of the pipes while being chamfered and to provide a bevel of uniform width on the chamfered edges of the pipes. As will be seen by reference to Figs. 6, 7 and 8, a T-head bolt 46 forming part of the chucks is secured in the slots 39, 40, in the face plate, a separator 54 and washer 55 spanning the slots 39, 40, so the nut 56 will rigidly hold the bolts 46 in position within the slots.

The recessed or forked end of the chucks or tool holders 48 and 49 for the chamfering tools 50, 51, embraces the separators 54 on the bolts 46, the chucks 48, 49, also having an elongated hole or slot 57 therein for the cap bolts 47 screw threaded into openings in the face plate 3. A projection 58 on the tool holders or chucks 48, 49, extends downwardly into the slots 39, 40, in the face plate and one end of the projection 58 is in engagement with the end of the recess 59 in the elongated head 60 of the T-head bolts 46 within the slots. Positioned within the hole or recess in the projection 58 is a helical spring 61 with one end in engagement with the bottom of the hole, and the other end of the spring 61 engages with the end of the adjusting screw 62 on the T-head of the bolts 46, 46, the adjusting screws 62 being arranged to vary the amount of compression on the springs 61. In this way the chucks for the chamfering tools are arranged to yieldingly hold the chamfering tools 50, 51, against the edge of the pipe ends in chamfering the pipe so that slight irregularities in the surface or inaccuracies in the contour of the pipe will not prevent a uniform bevel being provided on the edges of the pipe in the chamfering operations, while turning the adjusting screws 62 and thereby increasing the compression on the springs 61, increases the force with which the chamfering tools engage with the pipe.

Located in front of and forming part of the chamfering machine 2 is a carriage forming a gripping mechanism by which the pipes are held to prevent rotation and lengthwise movement while being operated upon by the rounding dies 22, 23, of the pipe rounding mechanism on the carriage 17, and by the tools or cutters 45, 45, 50, 51, of the facing and chamfering machine 2. The gripping mechanism comprises a stationary top die 63 which is removably secured to the cross-head 64 and a vertically movable bottom die 65 which is removably secured on the upper end of a plunger 66 in the fluid pressure cylinder 67 on the base 68 of the gripping mechanism. The bending faces 63ª, 65ª, of the dies 63, 65, preferably are made slightly elliptical with the major axis of the ellipse extending horizontally so that when the pipe ends are being rounded the flattened portions at the weld of the pipes being at the side or in line with the major axis of the ellipse will be sprung outwardly so as to give this portion of the pipe a permanent set, which when the bending dies are released will enable the pipe ends to spring into a substantially true circle having the flattened surface at the weld permanently removed.

The base 68 is connected by four posts or columns 69 to the cross-head 64. The single acting cylinder 67 is provided with a port which is connected by the pipe 70 through a suitable three-way valve (not shown) with a source of fluid pressure.

Positioned in front of the facing and chamfering machine and the gripping mechanism is a series of substantially horizontal skids 71 to support the pipes while being rolled into the plane of the axis of the facing machine and gripping mechanism into position to be moved lengthwise into and out of position to be engaged by the rounding blocks and facing tools.

The skids 71 which as shown are arranged in pairs are pivotally connected at their ends to supports formed by pedestals 72 and vertical adjusting screws 73, the nuts 74 when turned moving the screws 73 to raise and lower the skids 71. As the size of the pipes operated upon will vary from time to time the skids 71 are made vertically adjustable to enable the axis of the pipes when supported on the skids to be brought into alinement with the fixed axis of the rotating face plate 3, and the clamping dies 22, 23, and the bending dies 63, 65.

The supports formed by the pairs of skids 71 have an anti-friction roller 75 rotatably secured in a bearing box 76 located between and fastened to the sides of the skids 71, the axis of these rollers extending horizontally and at right angles to the axis of a pipe supported on the rollers, the rollers 75, 75, supporting the pipe when it is in axial alinement with the rounding mechanism and chamfering and facing machine, and serving to facilitate the movement of the pipes endwise in moving the pipes into and out of operating position relative to the bending mechanism and facing machine 2. Also positioned in line with the axis of the facing and chamfering machine 2 and the pipe gripping mechanism, at a point between the rollers 75, 75, is a vertically movable support 77ª. This support comprises two anti-friction rollers 77, 77, secured in bearings 78, with the axes of the rollers 77 extending horizontally in a direction parallel with the axis of the pipe supported thereon, so that when carried on the rollers 77, 77, the pipes are readily rotated to bring the seam or weld of the pipe in the desired position, ordinarily one at a point between the top and bottom surface of the horizontally extending pipe.

The bearings 78 are secured to the upper end of the plunger 79 of a vertical fluid pressure cylinder 80. The upper end of the plunger 79 is threaded and a helical spring 81 on the plunger yieldingly engages the nut 82 on the screw threaded end of the plunger to cushion the downward movement of the plunger 79 in the cylinder 80. The plunger 79 and cylinder 80 are employed to raise and lower the anti-friction rollers 77, 77, into and out of pipe supporting position. By the use of this intermediate pipe support, which is vertically movable, the pipes are lifted from the rollers 75, 75, and are supported on the rollers 77, 77, in a manner which permits the pipes to be readily rotated.

The operation of my improved apparatus will be readily understood by those skilled in the art. After the size of the pipes to be operated upon is determined the chucks 41, 42, 48 and 49 for the facing and chamfering tools are adjusted on the face plate 3 of the facing and chamfering machine so as to be in position to operate upon the pipe ends.

The holding dies 22, 23, will be adjusted relatively in the carriage 17 by manipulating the hand wheel 28 when the dies 22, 23, are placed in position in the carriage. Rounding dies 63 and 65 of the necessary size are then secured in adjusted position on the pipe rounding mechanism, and holding dies 22, 23, of the required size are adjusted in the window of the clamping mechanism forming part of my improved apparatus. The skids 71, 71, are then adjusted vertically so as to support the pipe to extend with its axis in horizontal alinement with the axis of the clamping and bending dies. The support 77ª also is adjusted vertically so that when in raised position the rollers 77, 77, will lift the pipe supported thereby above the rollers 75, 75, and in this way enable the pipe to be readily rotated or turned axially.
The parts being adjusted as has been described, a pipe is transferred by rolling it on the skids 71, 71, from the hot bed or storage bed to the rollers 75, 75. Fluid pressure is then admitted to the cylinder to raise the plunger 79 and cause the pair of rollers 77, 77, to engage with the pipe and lift it from the rollers 75, 75. The pipe is then turned axially on the rollers 77 to bring the seam or weld opposite the parting between the dies 63, 65, or at a point other than in a plane on the vertical axis of the pipe, the pipe being somewhat flattened or distorted on the seam or weld on account of the enormous pressure developed in the welding operation. The plunger 79 is then lowered, the pipe thereby being transferred to the rollers 75, 75, and the pipe is then moved lengthwise until its forward end is between the rounding dies 63, 65, of the rounding mechanism. Fluid pressure is then admitted to the cylinder 67 of the rounding mechanism and the plunger is raised to lift the bottom rounding die 65, and by engagement with the end of the pipe bend the pipe and remove any flat spots and make the end of the pipe truly cylindrical and of substantially uniform diameter. When desirable or necessary the rounding dies 63, 65, will be brought into engagement with the end of the pipe a number of times in rounding the end of the pipe, and the pipe may be turned between the operative movements of the dies to change the position of the pipe end axially with respect to the dies. When the rounding operation is completed the bottom die 65 is lowered, in which position it ordinarily remains during the facing and chamfering operations. The pipe is moved lengthwise upon the rollers 75, 75, until it projects beyond the holding blocks 22, 23, on the carriage 17 with its end in position to be engaged by the cutting tools on the face plate 2 of the chamfering and facing machine. The hand wheel 18 is then turned to move the carriage 17 on the shears 16, 16, and move the pipe lengthwise and bring its end into cutting engagement with the facing tools 45, 45, and the chamfering tools 50, 51, on the rotating head or face plate 3 of the facing and chamfering machine. Engagement of the cutting tools 45, 50 and 51 with the end of the pipe faces off its end squarely and chamfers or bevels the corners of the faced end of the pipe. As the end of the pipe has been rounded or made truly cylindrical a uniform bevel will be formed on the pipe by the yielding chamfering tools so that the end of the pipe will be in the desired favorable condition for the later thread cutting operations. As the chamfering tools are yieldingly held in position against the edges of the pipe end by the compression springs 61 inequalities in the surface of the pipe at the ends thereof will be compensated for. The clamping die 22 on the carriage is then retracted to release the pipe and the pipe is moved rearwardly lengthwise until clear of the rounding mechanism, when it will be supported upon the rollers 75, 75. When but one pipe finishing apparatus is employed the rollers 77, 77, will be lifted to engage and support the pipe and the pipe is then turned end for end, and the other or unfinished end of the pipe is first inserted between the rounding dies and after being rounded thereby, as has been described, is moved forwardly lengthwise until it projects through the clamping dies on the carriage 17. The carriage 17 is then adjusted on the ways 16, 16, by means of the hand wheel 18 to bring the end of the pipe into cutting engagement with the chamfering and facing tools on the rotating face plate 3. When this end of the pipe has been finished by bringing it into engagement with the cutting tools on the face plate, the carriage 17 is moved backwardly by means of the hand wheel 18, the clamping die 22 is retracted to release the pipe, and the pipe is then moved backwardly until clear of the rounding mechanism after which it is moved transversely on the skids 71, to a place of storage or to pipe threading machine by which the threads are provided on the ends of the pipe.

Preferably, two sets of pipe finishing apparatus like that shown in the drawings will be employed, one operating on one end of the pipes in rounding, facing and chamfering this end of the pipes, and the second set of apparatus operating on the opposite end of the pipe, the two sets of apparatus being in staggered relation and on opposite sides of the support formed by the skids 71.

The above described operations are then repeated with the successive pipes to round the ends of the pipe and make them truly cylindrical, and to face and chamfer the rounded ends of the pipes.

The advantages of my invention, which will be appreciated by those skilled in the art, arise from the novel arrangement and combination of apparatus shown in the drawings and herein described. Instead of facing and chamfering pipe ends which are not truly cylindrical and thereby producing pipes having black threads, the ends of the pipes are rounded or made cylindrical and the rounded pipe ends are then faced and chamfered so that the later threading operations are facilitated and the production of black threads on the pipes is materially reduced and practically eliminated, while the opposite ends of the pipes are made of equal diameter instead of one end being slightly larger than the other, as is the case when the ends of the pipes are threaded without having been rounded after the welding operation.

Modifications in the construction and arrangement of the parts may be made without departing from my invention as defined in the appended claims.

I claim:—

1. Apparatus for finishing pipes comprising rotary pipe facing and chamfering means, and pipe supporting means in front of said facing and chamfering means, said supporting means having sets of rollers to support the pipes when moving the pipes endwise, a second set of rollers to support the pipes when being rotated or turned axially, and means for causing a relative adjustment of said sets of rollers whereby a pipe supported on one set is transferred to the other set thereof.

2. Apparatus for finishing pipes comprising rotary pipe facing and chamfering means, pipe rounding mechanism in front of and in alinement with said means, and pipe supporting means in front of said facing means and rounding mechanism, said supporting means having sets of rollers to support the pipe when moving the pipe endwise, a second set of rollers to support the pipe when being rotated or turned axially, and means for causing a relative vertical movement of said sets of rollers whereby a pipe supported on one set is transferred to the other set thereof.

3. Apparatus for finishing pipes comprising rotary pipe facing and chamfering means, pipe rounding mechanism in front of and in alinement with said means, pipe supporting means in front of said facing and chamfering means and rounding mechanism, said supporting means having sets of rollers to support the pipes when moving the pipes endwise, a second set of rollers to support the pipes when being rotated or turned axially, and means for causing a relative vertical movement of said sets of rollers whereby a pipe supported on one set is transferred to the other set thereof, and horizontal skids extending on opposite sides of the rollers on which the pipes are rolled transversely into and out of position on said sets of rollers.

4. Apparatus for finishing pipes comprising rotary pipe facing and chamfering means, pipe rounding mechanism in front of and in alinement with said means, and pipe supporting means in front of said facing and chamfering means and rounding mechanism, said supporting means having a set of rollers to support the pipes when moving the pipes endwise, a second set of rollers to support the pipes when being rotated or turned axially, and means for causing a relative movement of said sets of rollers whereby a pipe supported on one set is transferred to the other set thereof, and horizontal skids extending on opposite sides of the rollers on which the pipes are rolled transversely into and out of position on said sets of rollers, said skids and rollers being vertically adjustable to hold pipes of varying sizes in alinement horizontally with the rotary facing means.

5. Apparatus for finishing pipes comprising a facing machine having cutting tools for facing and chamfering the pipe ends, means movably mounted on the facing machine for gripping and moving the pipes lengthwise into cutting engagement with said cutting tools, a pipe rounding mechanism in front of said facing machine having relatively movable dies adapted to engage with and round the ends of pipes to be faced and chamfered and having means for causing a relative approach of said dies, and means in front of said rounding mechanism forming a horizontal pipe support, said means having sets of horizontal rollers with the axes thereof extending at right angles to the axis of the pipe for supporting the pipes in moving the pipes lengthwise, horizontal rollers with the axes thereof extending parallel to the longitudinal axis of the pipe for supporting the pipes when being turned or rotated, and means for causing a relative vertical movement of the sets of rollers to transfer the pipes from one to the other thereof.

6. Apparatus for finishing pipes comprising a facing machine having cutting tools for facing and chamfering the pipe ends, means movably mounted on the facing machine for gripping and moving the pipes lengthwise into cutting engagement with said cutting tools, a pipe rounding mechanism in front of said facing machine having relatively movable dies adapted to engage with and round the ends of pipes to be faced and chamfered and having means for causing a relative approach of said dies, means in front of said rounding mechanism forming a horizontal pipe support, said means having sets of horizontal rollers with the axes thereof extending at right angles to the axis of the pipe for supporting the pipe in moving the pipe lengthwise, horizontal rollers with the axes thereof extending parallel to the longitudinal axis of the pipe for supporting the pipe when being turned or rotated, means for causing a relative vertical movement of the sets of rollers to transfer the pipe from one to the other thereof, and a series of horizontal skids extending on opposite sides of said rollers on which the pipe is moved into and out of position on said rollers.

7. Apparatus for finishing pipes comprising a facing machine having cutting tools for facing and chamfering the pipe ends, means movably mounted on the facing machine for gripping and moving the pipes lengthwise into cutting engagement with said cutting tools, a pipe rounding mechanism in front of said facing machine having relatively movable dies adapted to engage with and round the ends of pipes to be faced and chamfered and having means for causing a relative approach of said dies, means in front of said rounding mechanism forming a horizontal pipe support, said means having sets of horizontal rollers with the axes thereof extending at right angles to the axis of the pipe, for supporting the pipes in moving the pipes lengthwise, horizontal rollers with the axes thereof extending parallel to the longitudinal axis of the pipe for supporting the pipes when being turned or rotated, means for causing a relative vertical movement of the sets of rollers to transfer the pipes from one to the other thereof, a series of horizontal skids extending on opposite sides of said rollers on which the pipes are moved into and out of position on said rollers, and means for adjusting said skids and rollers vertically to maintain pipes of varying sizes in horizontal alinement with the rounding mechanism and facing machine.

8. Apparatus for finishing pipes comprising a facing machine having a positively actuated rotary face plate, a plurality of tool holders adjustably secured on said face plate, removable facing tools rigidly mounted on part of said tool holders, removable chamfering tools yieldingly mounted on others of said tool holders, said chamfering tools forming floating cutters adapted to yieldingly engage and chamfer the edges of the pipe, and means for holding the pipe against rotation in the facing and chamfering operations.

9. Apparatus for finishing pipes comprising a facing machine having a positively actuated rotary face plate, a plurality of tool holders adjustably secured on said face plate, removable facing tools rigidly mounted on part of said tool holders, removable chamfering tools yieldingly mounted on others of said tool holders, said chamfering tools forming floating cutters adapted to yieldingly engage and chamfer the edges of the pipe, means for holding the pipe against rotation in the facing and chamfering operations, and means for causing a relative approach of said pipe and face plate.

10. Apparatus for finishing pipes comprising a facing machine having a positively actuated rotary face plate, tool holders adjustably secured on the face plate, removable facing tools rigidly secured in part of said tool holders, removable chamfering tools yieldingly mounted in others of the tool holders, said tools being adapted to engage the end of the pipes being faced and chamfered, and gripping means for holding the pipe against rotation in the facing and chamfering operations, said gripping means being adjustable relative to the face plate to move the pipe into cutting engagement with the rotating facing and chamfering tools.

In testimony whereof I have hereunto set my hand.

JOSEPH W. LATSHAW.